United States Patent [19]
Cooper

[11] Patent Number: 6,150,930
[45] Date of Patent: Nov. 21, 2000

[54] VIDEO EQUIPMENT AND METHOD TO ASSIST MOTOR VEHICLE OPERATORS

[75] Inventor: Alan Neal Cooper, Coppell, Tex.

[73] Assignee: Texas Instruments Incorporated, Dallas, Tex.

[21] Appl. No.: 07/930,880

[22] Filed: Aug. 14, 1992

[51] Int. Cl.[7] .............................. B60Q 1/00; H04N 7/18
[52] U.S. Cl. ................... 340/435; 340/425.5; 340/525; 340/903; 340/555; 348/33; 348/135; 348/148; 348/149; 348/162; 348/164; 250/332
[58] Field of Search ................................... 340/435, 903, 340/525, 555, 556, 425.5; 358/108–113; 348/135, 143, 162, 164, 144, 148, 149, 272, 266, 267, 29, 30, 33; 250/330, 332, 334, 336.1, 338.1, 338.4

[56] References Cited

U.S. PATENT DOCUMENTS

| | | | |
|---|---|---|---|
| 3,962,578 | 6/1976 | Roschen | 250/226 |
| 4,642,687 | 2/1987 | Wedgwood et al. | 358/110 |
| 4,651,001 | 3/1987 | Harada et al. | 250/332 |
| 4,679,068 | 7/1987 | Lillquist et al. | 358/44 |
| 4,751,571 | 6/1988 | Lillquist | 250/332 |
| 4,939,369 | 7/1990 | Elabd | 250/332 |
| 4,969,037 | 11/1990 | Poleschinski et al. | 358/113 |
| 4,995,061 | 2/1991 | Hynecek | 377/58 |
| 5,001,558 | 3/1991 | Burley et al. | 358/113 |
| 5,107,333 | 4/1992 | Poque et al. | 358/113 |

OTHER PUBLICATIONS

"TC217" Area Array Image Sensor Products Data Manual, pp. 2–63 to 2–63, Texas Instruments Incorporated, Jan. 1992.

"TC244" area array Image Sensor Products Data Manual, pp. 2–133 to 2–135, Texas Instruments Incorporated, Jan. 1992.

Texas Instruments CCD Area Array Image Sensors Product Bulletin, Texas Instruments Incorporated, Jan. 1992, SOCT028A.

Advance Design Information, TC252/TC253, Jan. 1992.
Gary Stix "Defensive Driving", *Scientific American*, pp. 164 B & 166, Sep. Jan. 1992.

*Primary Examiner*—Donnie L. Crosland
*Attorney, Agent, or Firm*—W. Daniel Swayze, Jr.; Wade James Brady, III; Frederick J. Telecky, Jr.

[57] ABSTRACT

A video system (30) including an illuminator (26) and a silicon detector (34) which provides operators of motor vehicles (20) with an enhanced display of the vehicle's operating environment (24 and 28). The illuminator (26) provides a source of short wavelength infrared energy. A single silicon detector (34) processes electromagnetic signals in the short wavelength infrared spectrum and selected color signals in the visible light spectrum. A visual display (60) of the operating environment comprising the infrared image with enhancements from selected portions of the colored light spectrum are provided to the operator of the vehicle (20).

19 Claims, 2 Drawing Sheets

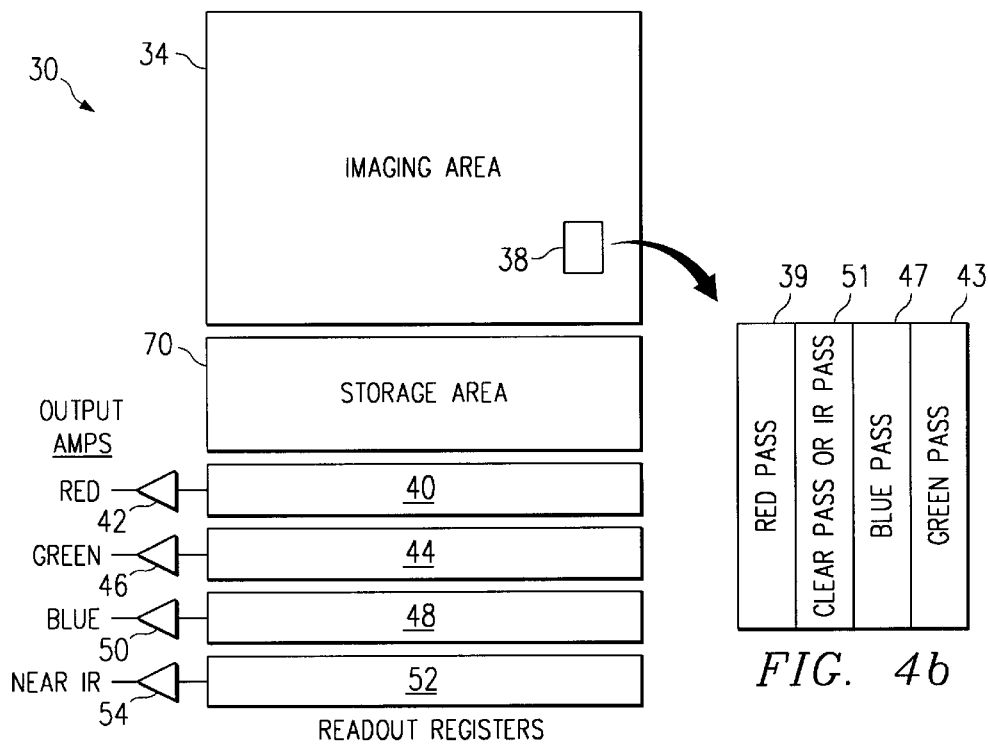
FIG. 4a
FIG. 4b
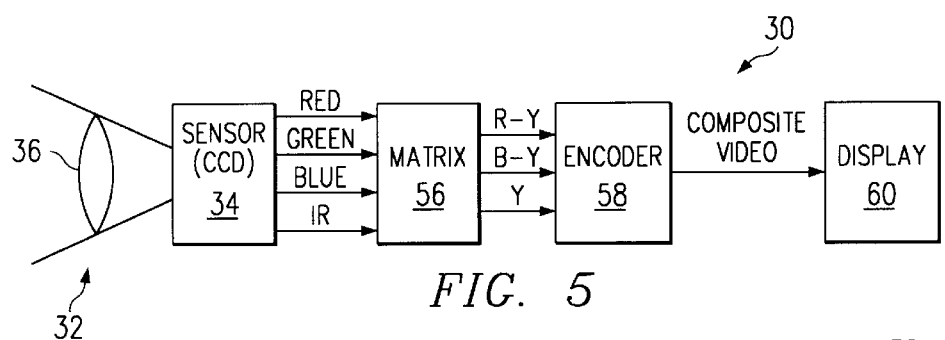
FIG. 5
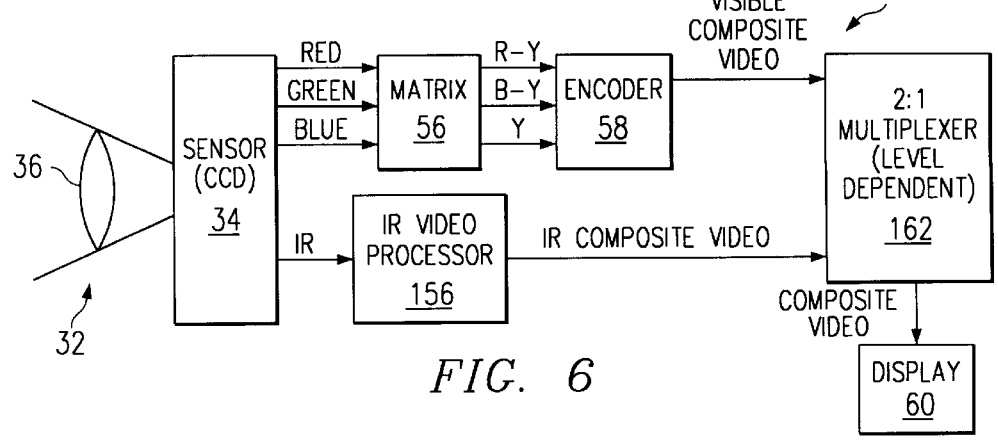
FIG. 6

VIDEO EQUIPMENT AND METHOD TO ASSIST MOTOR VEHICLE OPERATORS

TECHNICAL FIELD OF THE INVENTION

This invention relates to video equipment and more particularly to a system which will assist vehicle operators during night time and low visibility operating conditions.

BACKGROUND OF THE INVENTION

Various techniques have previously been used to provide operators of motor vehicles such as automobiles and trucks with an improved view of their surrounding conditions during night driving or low visibility conditions (fog, smoke, snow, etc.). These techniques include using brighter illuminators (stronger headlights) or headlights with a visible light wavelength which has better penetrating power under low visibility conditions (yellow fog lights). The use of stronger headlights is limited by the negative effect which bright headlights have on approaching drivers. The use of yellow fog lights is an improvement, but its advantages are limited depending upon the absorption characteristics of the fog or other inclement weather condition which produced the poor visibility.

Active systems to assist automobile drivers such as radar have been considered but have generally been found to be unsatisfactory due both to the active emissions associated with these systems and their high cost to purchase and maintain. Long wavelength infrared detectors which operate in a range of eight to ten microns have also been proposed for use in motor vehicles such as automobiles or trucks. At the present time, the cost of a long wavelength infrared detector is still excessive for wide spread commercial use. Long wavelength infrared cameras do not detect or "see" visible color information such as brake lights and stop lights. Therefore, even if a long wavelength infrared camera and display system were available at a reasonable cost, it would not provide critical information needed by a motor vehicle operator.

A need has arisen for an improved video display of road conditions and operating environment for motor vehicles particularly during low visibility and night driving conditions. Frequently, during highway and freeway driving at night time, an automobile driver's range of vision will be less than the distance required for reaction time and braking time to safely stop the vehicle. Therefore, a need has arisen to provide automobile drivers and operators of other types of motor vehicles with an improved, cost effective video display of the road conditions in front of the vehicle and selected peripheral conditions.

SUMMARY OF THE INVENTION

In accordance with the present invention, disadvantages and problems associated with previous methods to provide vehicle operators with an enhanced visual display of their operating environment have been substantially reduced or eliminated by using equipment incorporating the present invention. By taking advantage of the characteristics of the short wavelength infrared spectrum and the operating characteristics of silicon detectors, an enhanced video display can be provided to a vehicle operator at a reasonable cost.

In accordance with one aspect of the invention, an enhanced video display system including an illuminator which functions as a source of short wavelength infrared energy and a silicon detector which can detect four separate wavelengths of electromagnetic energy such as blue, green, red and short wavelength infrared are provided to a motor vehicle operator. The system includes equipment to process analog signals from the silicon detector and to enhance an infrared image of road conditions in front of the vehicle and selected peripheral conditions with color signals from critical items such as stop lights, traffic lights, and other signals associated with driving safety.

The present invention has significant technical advantages in that using a short wavelength infrared system allows the illuminator to project infrared energy at relatively high power levels without having an adverse effect on drivers of approaching vehicles. The illuminator can project the infrared energy at a considerable distance from the motor vehicle as compared with traditional headlights.

The present invention has another significant technical advantage in that a single silicon detector can function as a multispectral sensor to provide an analog signal with short wavelength infrared information and analog signals associated with selected colors in the visible light spectrum. The visible color signals are used to enhance the infrared display and provide the motor vehicle operator with critical information such as stop signs, traffic lights, brake lights, etc.

The present invention has further significant technical advantages in that the detector system preferably includes a lateral overflow drain to retain short wavelength infrared response capability and at the same time have a high anti-blooming capability. Blooming in video systems is caused by intense, very bright light sources as compared to the surrounding environment. The detector of the present invention also has low "smear" characteristics. Preferably, a frame interline transfer or a line addressable silicon detector is used to reduce the tendency of the video system to "smear" when subjected to bright light sources such as headlights from approaching vehicles. The silicon based detector and associated signal processing equipment of the present invention provide good sensitivity in the short wavelength infrared spectrum and in the visible light spectrum. This sensitivity is achieved by the present invention providing high quantum efficiency, a large photosite area on the detector, a large fill factor, low noise amplifiers in the signal processing system, and a deep depletion region in the silicon detector for enhanced response to electromagnetic radiation in the short wavelength infrared spectrum.

BRIEF DESCRIPTION OF THE DRAWINGS

For a more complete understanding of the present invention and the advantages thereof, reference is now made to the following description taken in conjunction with the accompanying drawings in which:

FIG. 4a is a schematic drawing with portions broken away showing a silicon based detector and portions of the signal processing circuits used with the video system of the present invention;

FIG. 4b is an enlarged schematic drawing of a portion of the imaging area of the detector of FIG. 4a;

FIG. 5 is a block diagram of the detector of FIG. 4 and associated signal processing circuits to provide a visual display to the operator of the motor vehicle shown in FIG. 1; and FIG. 6 is a block diagram showing alternative signal processing circuits for use with the detector of FIG. 4.

DETAILED DESCRIPTION OF THE INVENTION

Figure 1:
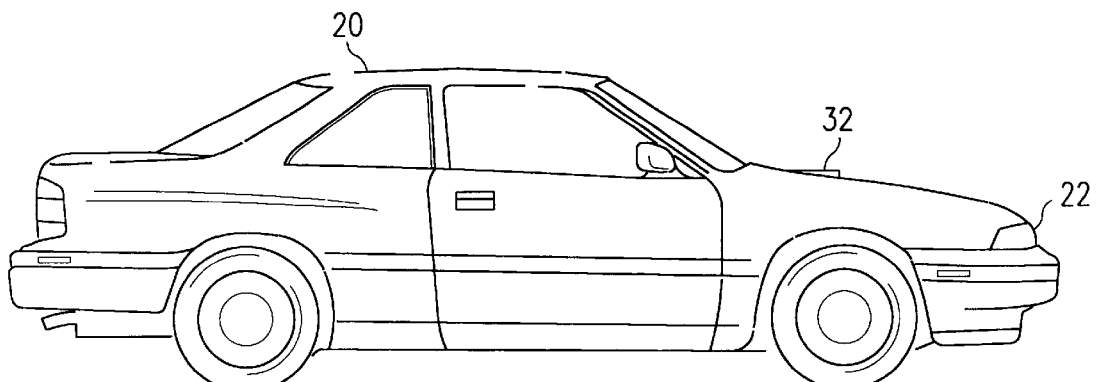
FIG. 1 is a schematic drawing in elevation of a side view of a motor vehicle with a video system and display which incorporates the present invention.
Figure 2:
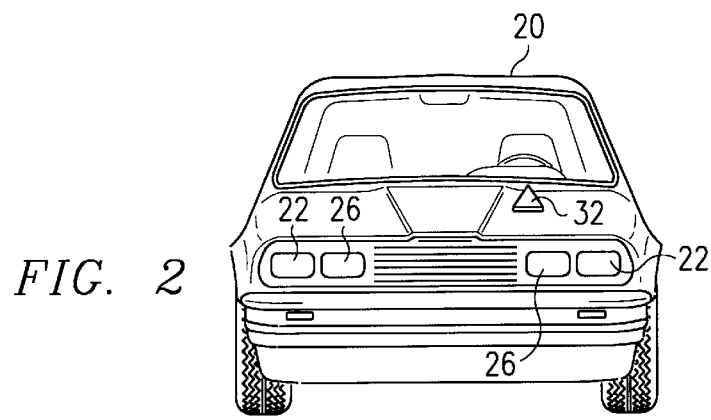
FIG. 2 is a schematic drawing in elevation showing the front view of the motor vehicle of FIG. 1.
Figure 3:
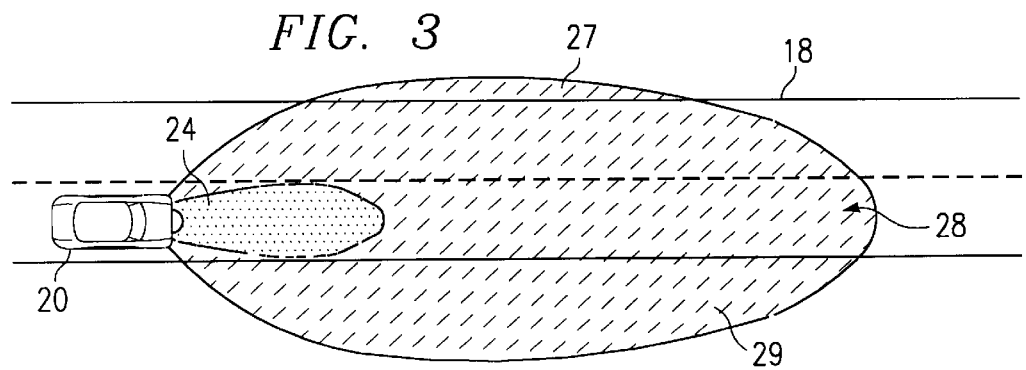
FIG. 3 is a plan view of a schematic drawing showing the motor vehicle of FIG. 1 on a typical highway and a comparison of the infrared illuminator of the present invention with the visible light beam from conventional headlights.

In FIGS. 1, 2 and 3 automobile 20 represents a motor vehicle with video system 30 and visual display 60 of the present invention. Various types of motor vehicles could be satisfactorily used with the present invention in addition to automobile 20. Important components of the present invention include illuminators 22 and 26. As shown in FIG. 2, illuminators 22 are a pair of commercially available headlights which project broad band electromagnetic radiation including the visible light spectrum. Illuminators 26 are a pair of headlights which have been optimized to produce short wavelength infrared electromagnetic radiation. As will be explained later in more detail, infrared illuminators 26 project short wavelength infrared radiation over a substantially larger area in front of automobile 20 as compared to the visible light projected by commercially available headlights 22. FIG. 3 shows the difference between the coverage of short wavelength infrared radiation 28 as compared to the area covered by visible light 24.

Another important element of the present invention shown in FIGS. 1, 2 and 3 is video camera 32. As will be explained later in more detail, video system 30 including video camera 32 provides the operator of automobile 20 with a visual display of the road conditions in front of automobile 20 covered by infrared pattern 28 and visible light pattern 24. Infrared pattern 28 covers peripheral portions 27 and 29 adjacent to road 18 which are outside the scope of visible light pattern 24. Infrared illuminator 26 with pattern of coverage 28 allows video system 30 to detect people and objects approaching road 18 at much greater distances than using only headlights 22.

Video camera 32 preferably includes a single silicon based detector 34. Since silicon detectors are sensitive to (react with) electromagnetic radiation in both the visible light range and in the short wavelength infrared spectrum, silicon detectors are particularly suited for use with the present invention. Video system 30 relies on using electromagnetic radiation in the short wavelength infrared or near infrared spectrum of 0.65 to 1.1 microns and in the visible light spectrum of 0.4 to 0.65 microns. Another advantage to using both the visible light spectrum and the short wavelength infrared spectrum is that optical components such as lens 36 of video camera 32 will function to satisfactorily focus both visible light and short wavelength infrared radiation. Therefore, the present invention requires only one set of optics, provided by camera 32.

Various types of silicon based detectors are commercially available for use with the present invention. Examples of such silicon based detectors are charge coupled device (CCD) image sensors designated TC217, TC244, TC252 and TC253 which are commercially available from Texas Instruments Incorporated located in Dallas, Texas. A charge coupled device is preferred for use as the silicon detector because it has an active area which is relatively deep with respect to reactions with short wavelength infrared radiation. The depth of the active silicon area should be approximately ten microns. If the depth of the active silicon area is less than ten microns, the detector will lose sensitivity to short wavelength infrared radiation.

A charge coupled device basically means that an electrical charge which is generated from a photon (unit of electromagnetic radiation) is kept together as a packet within the signal processing system for the sensor. The packet of energy is transferred through the various components of the system to produce an electrical signal in response to electromagnetic radiation impacting the imaging area. The packet of energy generated within the imaging area is moved to an amplifier and then as an output to other components of video system 30.

As shown in FIGS. 4a and 4b, the imaging area of detector 34 is typically a column of photosites which react when exposed to electromagnetic radiation. The imaging area of detector 34 is broken into an array of pixels or cells. Each individual photosite or cell has an electrical potential built on the photosite so that when electromagnetic radiation falls within a photosite or cell, the electrical charge produced by reaction with the silicon based material within the cell will produce a packet of energy.

FIG. 4b shows an expanded portion 38 of the imaging area with a series of columns of filters to block or absorb undesired electromagnetic radiation and to allow specific wavelengths of electromagnetic radiation to interact with silicon beneath the individual filters. As best shown in FIG. 4b, the present invention has a series of filter gels such as red gel 39 which will pass red visible light and will block all other visible light and short wavelength infrared. The present invention also uses blue gel 47, green gel 43 and either clear, wide band pass gel or short wavelength infrared gel 51. Depending upon the specific operating requirements of video system 30, a clear gel covering the whole spectrum of 0.4 microns to 1.1 microns could be used or a gel selected for only short wavelength infrared radiation.

One of the significant differences between video camera 32 and detector 34 of the present invention is the use of four filter gels. Commercially available video cameras have various filter blocks for the colored light spectrum but do not have a filter block for the short wavelength infrared spectrum.

The imaging area detector of 34 will preferably have four filters which include the colors red, green and blue and either short wavelength infrared or clear. Other types of filtering are available such as complimentary filters which pass all visible wavelengths but notch out a particular color. In this types of filter system, blue and green would be passed and red blocked out. Another filter would pass green and red but block out blue and the third filter would pass red and blue and block out green. The main requirement for whichever filtering system is selected is the ability to distinguish between visible colors in the red wavelength, blue wavelength and green wavelength and short wavelength infrared.

In detector 34, after electromagnetic radiation of the proper wavelength has passed through its respective filter, the information is collected in a storage area or memory for later transfer to a readout register and an output amplifier for the appropriate wavelength. For example, in video system 30, information from storage area 70 is sent to readout register 40 which collects electrical charges associated with red wavelength light impacting on the imaging area of detector 34 and electrical signal corresponding to the red wavelength of light will be sent to output amplifier 42. In the same manner, an electrical signal corresponding to green wavelengths will be collected on readout register 44 from storage area 70 and directed to output amplifier 46, blue wavelengths collect on readout register 48 and go to output amplifier 50 and short wavelength infrared collects on readout register 52 and goes to output amplifier 54. Electrical signals corresponding to red, green, blue and infrared wavelengths respectively are next sent to matrix 56. Portions of each of these signals are combined within matrix 56 to produce a luminance signal.

The luminance signal is black and white information and information as to how bright each of the three colors are. Within matrix 56, you can determine both the saturation of a color and the intensity of a color and the hue or what is the color. The present invention will typically produce a primary luminance signal based on the short wavelength infrared energy striking detector 34.

As shown in FIG. 5, the short wavelength infrared image may be augmented with color information at encoder 58. The composite video signal is then sent from encoder 58 to display console 60. Display 60 will normally present a black and white picture based on information from short wavelength infrared radiation of the portion of road 18 in front of automobile 20 and peripheral areas 27 and 29. The black and white picture will be enhanced with colored information for objects such as tail lights and stop lights. Display 60 will preferably be presented on the dashboard or at another convenient location within automobile 20 using a commercially available cathode ray tube (CRT) or other display technology.

An alternative video system 130 for processing electrical signals from detector 34 is shown in FIG. 6. Electrical signals corresponding to electromagnetic radiation in the visible light wavelengths of red, green and blue are processed in the same manner as previously described for video system 30. The difference is that an electrical signal corresponding to the short wavelength infrared energy falling upon detector 34 is directed to a separate infrared video processor 156. The infrared video processor produces a composite video signal based on the infrared information. This infrared energy is directed towards multiplexer 162 which can also combine the visual signals from encoder 58 to produce a composite video signal on display 60.

Various algorithms are available for use with matrix 56 to obtain the desired composite video signal. The specific algorithm and the numerical values used with the algorithm can be selected so that objects such as tail lights or stop lights will be highlighted on the black and white image typically associated with infrared video displays. In system 130, the algorithm would be selected for a video display based on the colored light signals with information added (multiplexed) from the infrared signal. The specific mixing of the colored signals with the infrared signal at display 60 will depend upon the vehicle operating environment and the optimum display characteristics desired by the vehicle operator.

One of the principle functions of matrix 56 is to mix the input signals in accordance with the selected algorithm and provide the desired output to encoder 58. As shown in FIG. 5, the outputs from matrix 56 include a signal designated R-Y or red wavelength minus luminance, another signal designated B-Y or blue wavelength minus luminance, and a third signal Y or luminance. The Y signal or luminance signal may be based 100 percent on the infrared input to matrix 56 or may be only a selected portion, such as 50 percent of the infrared signal to matrix 56. The percentages for the luminance signal are dependent upon the particular algorithm used with matrix 56. Encoder 58 combines the output signals from matrix 56 into a single composite video signal for display 60.

For video system 130 shown in FIG. 6, an alternative signal processing circuit is shown. The output from encoder 58 is a composite visible light video signal. The infrared signal from sensor 34 is directed to video processor 156 to provide a composite infrared video signal. Both the visible and infrared video signals are directed to multiplexer 162 which rapidly switches between the two signals to provide a composite video output to display 60.

The basic components of the signal processing circuits used with detector 34 include storage or memory area 70, output registers 40, 44, 48, and 52, and output amplifiers 42, 46, 50, and 54, respectively. The signal processing circuits further include matrix 56, encoder 58, and if desired, infrared video processor 156 along with multiplexer 162. These components of the signal processing circuits cooperate to produce electrical signals corresponding to electromagnetic radiation which has reacted with the imaging area of detector 34. The signal processing circuits convert the electrical signals into the desired visual display 60 for the vehicle operator and enhance visual display 60 with selected portions of the colored light signal.

Commercially available headlights 22 produce visible light and infrared energy, particularly commercially available headlights which use tungsten filaments. Therefore, the present invention could be incorporated into existing automobiles with standard tungsten filament headlights. However, an important advantage of the present invention is that a separate source of infrared radiation 26 may be installed in automobile 20. Infrared headlights 26 may have significantly higher energy levels as compared to normal headlights 22. This difference in power is represented by the differences between infrared illumination pattern 28 and visible illumination pattern 24 of FIG. 3. The infrared illumination pattern 28 covers not only the conditions on road 28 that are directly in front of automobile 20 but also significant peripheral portions 27 and 29 adjacent to road 18. An important feature of the present invention is the ability to provide the operator with the peripheral road conditions in addition to road conditions directly in front of automobile 20.

In some respects infrared headlights 26 will be similar to presently available headlights 22. Commercially available headlights with tungsten filaments are black body radiators which emit a wide range of electromagnetic energy including visible light and short wavelength infrared. Differences might include supplying more power to infrared headlights 26 and placing a coating or filter on the lens of infrared headlights 26 which will block or substantially reduce the visible electromagnetic radiation generated by headlights 26 and still allow short wavelength infrared radiation to pass through. Various coatings and plastic coverings are commercially available to allow transmission of selected portions of the electromagnetic radiation spectrum generated by headlights with tungsten filaments.

An important requirement for satisfactory operation of the present invention will be a good anti-blooming capability. When video camera 32 of the present invention is operated at night, there will be a tendency for oncoming lights or other local bright sources of electromagnetic radiation to cause blooming within the imaging area 34. Various types of overload or anti-blooming protection are available for use with video cameras. When one cell or pixel in detector 34 is overloaded with electromagnetic radiation, the energy will flow into or spill over into adjacent pixels. This blooming can be eliminated in several ways. One of the earlier systems used a "vertical overflow drain". This type of system decreases the sensitivity of imaging area 34 to infrared radiation. The preferred anti-blooming system for use with the present invention will include a lateral overflow drain which basically destroys any electrical signals produced by the electromagnetic radiation when it exceeds a preselected level. This type of anti-blooming system provides optimum protection from very bright intense light sources and still provides electromagnetic sensitivity to short range infrared radiation.

In the lateral overflow drain system, when a pixel or cell is full it spills over a barrier into a drain adjacent to the pixel area. This allows the photosites of detector 34 to collect charge from as deep as possible. If the electromagnetic radiation exceeds the desired level, it will spill over into the adjacent lateral overflow drain without going into adjacent photosite areas. A lateral overflow drain will provide the desired performance for the present invention. Charge coupled device (CCD) image sensors are available from Texas Instruments with the preferred lateral overflow drain feature.

Another problem frequently experienced with video systems operating at night is called smear. Smear results from the fact that electrical signals are contained in visual imaging area 38 and in memory area 70. When the visual electrical signals are transferred to memory area 70, light from a bright source such as a rotating police light or very bright light on an emergency road vehicle will continue to impinge on imaging area 38 as the image is transferred to memory area 70. The present invention will preferably include a frame interline transfer device which will minimize the effect of smear. By having a clocking system which quickly moves information from the imaging area of detector 34 to interline transfer registers which are shielded from impinging light by light shields over the register, video camera 32 will minimize smear characteristics. By then transferring the image from interline register to storage area 70, smear is also minimized. Because the present invention is designed to work at night when there is very low illumination, smear and blooming will be problems. CCD image sensors designated TC252 and TC253 are available from Texas Instruments.

Those skilled in the art will readily note that the video system and enhanced display of the present invention may be used with standard automobile headlights, headlights which have been modified to provide enhanced infrared energy or with a separate source of infrared energy which has been optimized to produce the desired short wavelength infrared energy. Depending upon the design and operating requirements of the specific motor vehicle in which the system will be used and the anticipated operating conditions such as driving speed and weather, one or more illuminator with optimum characteristics may be incorporated with other components of the present invention. A single illuminator combining the output characteristics of headlights 22 and infrared illuminators 26 might be desired for some motor vehicles.

Although the present invention has been described with respect to an automobile, those skilled in the art will readily note that the present invention may be used with any motor vehicle such as a truck, motorcycle, light airplane, train, small boat, etc. The present invention may be used with any vehicle that has a motor which produces sufficient electricity to supply power to the video system components and relies at least in part on visual observations by the motor vehicle operator for safe operation of the vehicle.

Although the present invention has been described in detail, it should be understood that various changes, substitutions and alterations can be made therein without departing from the spirit and scope of the invention as defined in the following claims.

What is claimed is:

1. A video system which provides an operator of a vehicle with an enhanced visual display of selected portions of the vehicle's surrounding environment comprising:
   an illuminator to project short wavelength infrared energy;
   a single silicon detector for both short wavelength infrared and visible colored light electromagnetic radiation to generate both short wavelength infrared signals and visible colored light signals;
   a signal processing circuit to produce electrical signals corresponding to the detected electromagnetic radiation and based on said short wavelength infrared signals and said visible colored light signals;
   the signal processing circuit converting the electrical signals corresponding to the detected short wavelength infrared radiation into a visual display for the vehicle operator; and
   the signal processing circuit enhancing the visual display of the infrared signal with selected portions of the colored light signal.

2. The system of claim 1 wherein the illuminator further comprises a source of short wavelength infrared energy selected from the group consisting of a standard automobile headlight, an automobile headlight which reduces visible light while enhancing infrared energy transmission, or a separate short wavelength infrared energy transmitter.

3. The system of claim 1 wherein the detector further comprises:
   an imaging area sensitive to electromagnetic radiation;
   a plurality of filter blocks placed on the imaging area whereby only selected wavelengths of electromagnetic radiation are allowed to contact the imaging area under each filter block; and
   the signal processing circuit collecting information from specific cells in the imaging area and transmitting the resulting signal to a display terminal.

4. The system of claim 3 wherein the single silicon detector further comprises:
   the filter blocks on the imaging area comprising alternating stripes of filter gel which allow selected wavelengths of said short wavelength infrared and colored light electromagnetic radiation to pass through the filter gel and prevents passage of other wavelengths of electromagnetic radiation.

5. The system of claim 4 wherein the filter gels are selected from the group consisting of red wavelength pass, green wavelength pass, blue wavelength pass, clear pass or short wavelength infrared pass.

6. The system of claim 3 wherein the signal processing circuit further comprises:
   a readout register which collects electrical signals corresponding to electromagnetic energy pulses from each of the respective filter blocked portions of the imaging sensitive area; and
   an output amplifier associated with each output register to produce an electrical signal which is associated with the electromagnetic radiation transmitted through each of the respective filter blocks onto its respective imaging area.

7. The system of claim 3 wherein the signal processing circuit further comprises a lateral overflow drain to decrease the sensitivity of the silicon detector to a high energy, intense source of electromagnetic radiation.

8. The system of claim 3 wherein the signal processing circuit further comprises a frame interline transfer device to reduce the sensitivity of the silicon detector to high energy, intense sources of electromagnetic radiation.

9. The system of claim 3 wherein the signal processing circuit further comprises:

a matrix to produce a luminance signal based on the electrical signal corresponding to infrared radiation received by the detector; and an encoder to place selected portions of the color light signals on the luminance signal.

10. A video system which provides an operator of a vehicle with a visual display of selected portions of the environment surrounding the vehicle comprising:

an illuminator to project short wavelength infrared energy in the direction of the environment which will be displayed to the vehicle operator;

a single silicon based detector having multiple individual photosites to discriminate between selected portions of colored light spectrum and short wavelength infrared radiations;

a sensor to discriminate between selected portions of the colored light spectrum and short wavelength infrared radiation;

signal processing means for producing electrical signals corresponding to the selected portion of the colored light spectrum and the short wavelength infrared radiation; and the signal processing means also for converting the electrical signals into a visual display for the vehicle operator with enhanced information.

11. The video system of claim 10 further comprising:

an imaging area on the silicon based detector which is sensitivity to electromagnetic radiation; and a plurality of filter blocks placed on the imaging sensitive area to partially define the multiple individual photosites to discriminate between said selected portions of colored light spectrum and short infrared radiation.

12. The video system of claim 11 wherein the filter blocks further comprise alternating stripes of filter gel which transmit red, green and blue visible light and short wavelength infrared radiation.

13. The system of claim 11 wherein the signal processing circuits further comprise:

a readout register which collects electrical signals corresponding to electromagnetic energy pulses corresponding to selected colors in the visible light spectrum and short wavelength infrared radiation; and an output amplifier associated with each output register to produce an electrical signal which is associated with the electromagnetic radiation detected by the signal single sensor for each of the selected portions of the colored light spectrum in short wavelength infrared radiation.

14. A method for providing an operator of a vehicle with an enhanced visual display of selected portions of the vehicle's operating environment comprising:

projecting short wavelength infrared energy in the direction of the operating environment which will be displayed to the vehicle operator;

detecting on a single silicon based detector with an imaging area sensitive to electromagnetic radiation both short wavelength infrared and visible colored light electromagnetic radiation from the portion of the environment which will be displayed to the operator;

producing electrical signals corresponding to the detected short wavelength infrared and visible colored light electromagnetic radiation; and Using the electrical signals to prevent a visual display.

15. The method of claim 14 further comprising the steps of:

converting the electrical signal which corresponds to the detected short wavelength infrared radiation into the visual display; and enhancing the visual display of the infrared signal with selected portions from the colored light signal.

16. The method of claim 15 further comprising the steps of:

placing a plurality of filter blocks on the imaging area whereby only selected wavelengths of electromagnetic radiation are allowed to contact the imaging area underneath each filter block; and collecting information from specific cells in the imaging area and transmitting the resulting signal to a display terminal.

17. The method of claim 16 further comprising the step of decreasing the sensitivity of the silicon based detector to high energy, intense electromagnetic radiation sources by using a lateral overflow drain.

18. The method of claim 16 further comprising the step of decreasing the sensitivity of a silicon based detector to high energy, intense sources of electromagnetic radiation by using a frame interline transfer device.

19. The method of claim 14 further comprising the steps of:

using the color signals to present a visual display of the operating environment in the selected direction; and using the infrared signal to enhance the color visual display.

* * * * *